(12) United States Patent
Tsai et al.

(10) Patent No.: US 11,477,701 B2
(45) Date of Patent: Oct. 18, 2022

(54) APPARATUSES AND METHODS FOR VOICE CALL SERVICE PROVISION

(71) Applicant: MEDIATEK INC., Hsinchu (TW)

(72) Inventors: Chih-Yuan Tsai, Hsinchu (TW); Wei-Chiang Peng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 178 days.

(21) Appl. No.: 16/909,006

(22) Filed: Jun. 23, 2020

(65) Prior Publication Data

US 2021/0029593 A1 Jan. 28, 2021

Related U.S. Application Data

(60) Provisional application No. 62/876,841, filed on Jul. 22, 2019.

(51) Int. Cl.
*H04W 36/00* (2009.01)
*H04L 65/1016* (2022.01)
(Continued)

(52) U.S. Cl.
CPC ..... *H04W 36/0022* (2013.01); *H04L 65/1016* (2013.01); *H04W 36/14* (2013.01); *H04W 48/18* (2013.01)

(58) Field of Classification Search
CPC . H04W 36/0022; H04W 36/14; H04W 48/18; H04W 4/16; H04W 36/0011;
(Continued)

(56) References Cited

U.S. PATENT DOCUMENTS 10,136,453 B2 11/2018 Yeoum et al.
10,602,483 B2 3/2020 Singh et al.
(Continued)

FOREIGN PATENT DOCUMENTS

CN 105794307 A 7/2016
CN 107005963 A 8/2017
(Continued)

OTHER PUBLICATIONS

Chinese language office action dated Jan. 19, 2021, issued in application No. TW 109124549.
(Continued)

*Primary Examiner* — Michael Y Mapa
(74) *Attorney, Agent, or Firm* — McClure, Qualey & Rodack, LLP

(57) ABSTRACT

A mobile communication device including a wireless transceiver and a controller is provided. The wireless transceiver performs wireless transmission and reception to and from a 3rd Generation Partnership Project (3GPP) network using a first Radio Access Technology (RAT). The controller establishes one or more radio bearers with the first 3GPP network via the wireless transceivers, and establishes a secure tunnel with a non-3GPP interworking gateway of a second 3GPP network via the radio bearers. The second 3GPP network utilizes a second RAT. Also, the controller registers, via the secure tunnel, an IP Multimedia Subsystem (IMS) service with an IMS server communicatively connected to the second 3GPP network, so as to make a voice call over the first 3GPP network.

17 Claims, 6 Drawing Sheets

(51) Int. Cl.
*H04W 48/18* (2009.01)
*H04W 36/14* (2009.01)

(58) Field of Classification Search
CPC .. H04W 88/06; H04L 65/1016; H04L 65/104;
H04L 65/1073; H04L 65/1095; H04M
7/006
USPC .............................. 370/331; 455/435.1–445
See application file for complete search history.

(56) References Cited

U.S. PATENT DOCUMENTS

| | | | |
|---|---|---|---|
| 2011/0002267 A1* | 1/2011 | Dwyer | H04W 48/18 370/328 |
| 2013/0107863 A1 | 5/2013 | Faccin et al. | |
| 2015/0023277 A1 | 1/2015 | Kim et al. | |
| 2015/0036611 A1 | 2/2015 | Kim et al. | |
| 2015/0350983 A1 | 12/2015 | Kwok et al. | |
| 2016/0295386 A1 | 10/2016 | Faccin et al. | |
| 2017/0005914 A1* | 1/2017 | Edge | H04L 45/745 |
| 2017/0118255 A1* | 4/2017 | Tsai | H04L 63/0272 |
| 2018/0115978 A1* | 4/2018 | Shi | H04W 48/18 |
| 2019/0098487 A1* | 3/2019 | Boettger | H04W 8/183 |
| 2019/0297538 A1 | 9/2019 | Keller et al. | |
| 2020/0336305 A1* | 10/2020 | Li | H04W 12/06 |

FOREIGN PATENT DOCUMENTS

| | | |
|---|---|---|
| CN | 107431885 A | 12/2017 |
| CN | 110036664 A | 7/2019 |
| WO | 2017/026978 A1 | 2/2017 |

OTHER PUBLICATIONS

Chinese language office action dated Sep. 3, 2021, issued in application No. CN 202010699843.0.

* cited by examiner

APPARATUSES AND METHODS FOR VOICE CALL SERVICE PROVISION

CROSS REFERENCE TO RELATED APPLICATIONS

This Application claims priority of U.S. Provisional Application No. 62/876,841, filed on Jul. 22, 2019, the entirety of which is incorporated by reference herein.

BACKGROUND OF THE APPLICATION

Field of the Application

The application generally relates to wireless communications, and more particularly, to apparatuses and methods for voice call service provision.

Description of the Related Art

In a typical mobile communication environment, a mobile communication device, such as a mobile telephone (also known as a cellular or cell phone), or a tablet Personal Computer (PC) with wireless communications capability, may communicate voice and/or data signals with one or more service networks. Wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

However, according to the 3GPP specifications and/or requirements in compliance with the 5G NR technology, a mobile communication device camped on a 5G network must fall back to a 4G network to obtain voice call services if the 5G network does not support Voice over NR (VoNR). As a result, undesirable delay in voice call setup will be incurred due to that it generally takes a long time to complete the fallback procedure.

BRIEF SUMMARY OF THE APPLICATION

In order to solve the aforementioned problem, the present application proposes that the mobile communication device may use 5G radio bearers to connect to the evolved Packet Data Gateway (ePDG) of a 4G network, thereby allowing the mobile communication device to register the IP Multimedia Subsystem (IMS) service via the ePDG for obtaining voice call service when the mobile communication device is camped on a 5G network not supporting Voice over NR (VoNR).

In one aspect of the application, a mobile communication device comprising a wireless transceiver and a controller is provided. The wireless transceiver is configured to perform wireless transmission and reception to and from a first 3rd Generation Partnership Project (3GPP) network using a first Radio Access Technology (RAT). The controller is configured to: establish one or more radio bearers with the first 3GPP network via the wireless transceiver; establish a secure tunnel with a non-3GPP interworking gateway of a second 3GPP network via the radio bearers, wherein the second 3GPP network utilizes a second RAT; and register, via the secure tunnel, an IP Multimedia Subsystem (IMS) service with an IMS server communicatively connected to the second 3GPP network, so as to make a voice call over the first 3GPP network.

In another aspect of the application, a method for voice call service provision, executed by a mobile communication device communicatively connected to a first 3GPP network using a first RAT, is provided. The method comprises the steps of: establishing one or more radio bearers with the first 3GPP network; establishing a secure tunnel with a non-3GPP interworking gateway of a second 3GPP network via the radio bearers, wherein the second 3GPP network utilizes a second RAT; and registering, via the secure tunnel, an IMS service with an IMS server communicatively connected to the second 3GPP network, so as to make a voice call over the first 3GPP network.

In yet another aspect of the application, a non-transitory computer-readable storage medium having computer-readable instructions stored thereon that, when executed by a mobile communication device, cause the mobile communication device to:

establish one or more radio bearers with a first 3GPP network utilizing a first RAT; establish a secure tunnel with a non-3GPP interworking gateway of a second 3GPP network via the radio bearers, wherein the second 3GPP network utilizes a second RAT; and register, via the secure tunnel, an IMS service with an IMS server communicatively connected to the second 3GPP network, so as to make a voice call over the first 3GPP network.

Other aspects and features of the present application will become apparent to those with ordinarily skill in the art upon review of the following descriptions of specific embodiments of the mobile communication devices, the methods, and the non-transitory computer-readable storage media for voice call service provision.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
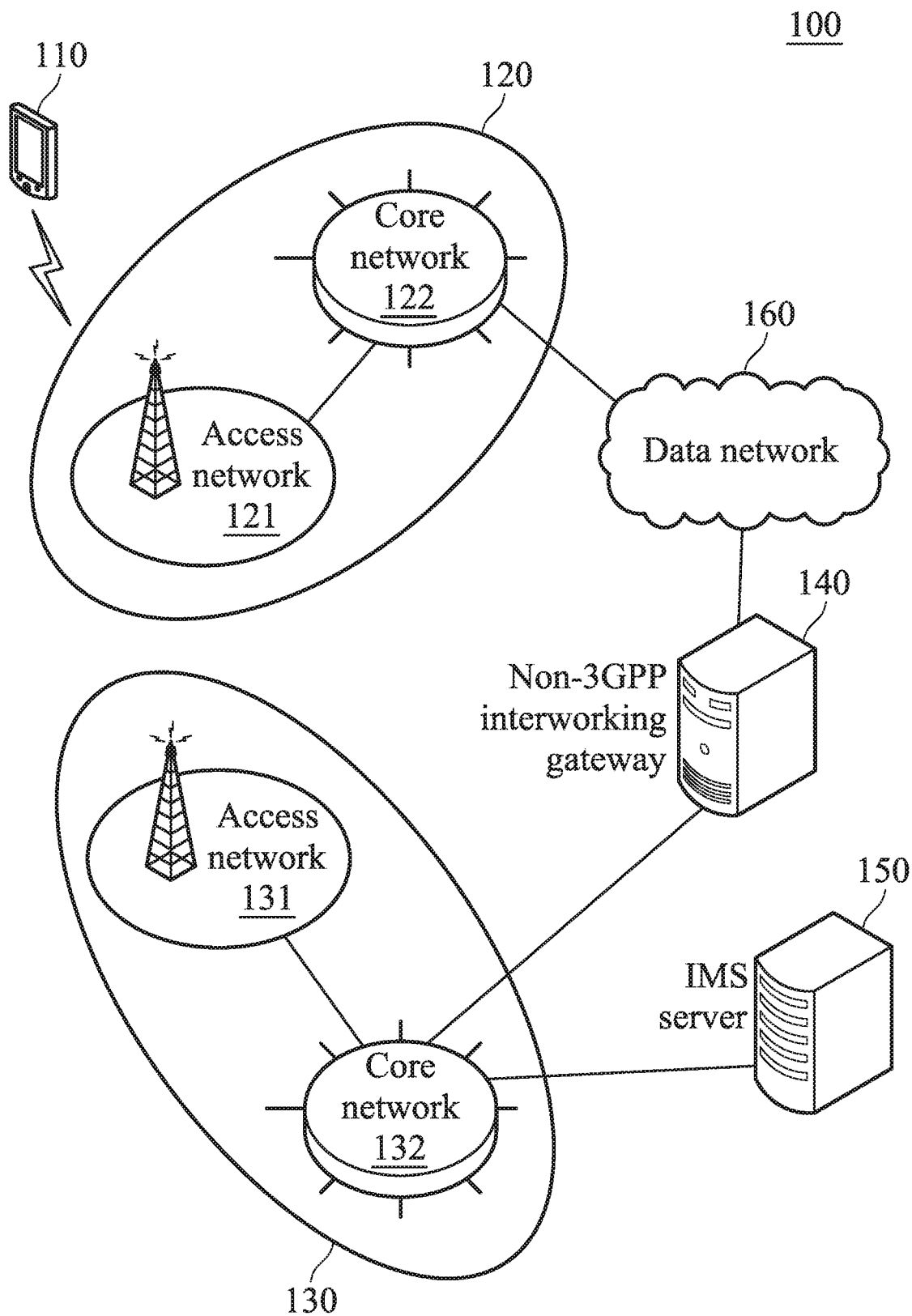
FIG. 1 is a block diagram of a wireless communication environment according to an embodiment of the application.

FIG. 1 is a block diagram of a wireless communication environment according to an embodiment of the application.

The wireless communication environment 100 includes a mobile communication device 110, two 3GPP networks 120 and 130, a non-3GPP interworking gateway 140, an IP Multimedia Subsystem (IMS) server 150, and a data network 160 (e.g., Internet).

The mobile communication device 110 may be referred to as a User Equipment (UE) or a Mobile Station (MS), such as a feature phone, a smartphone, a panel Personal Computer (PC), a laptop computer, or any computing device supporting the RATs utilized by the 3GPP networks 120 and 130.

The RAT utilized by the 3GPP network 120 is more advanced than the RAT utilized by the 3GPP network 130. That is, the 3GPP network 120 is more advanced than the 3GPP network 130. For example, the 3GPP network 120 may be a 5G network, while the 3GPP network 130 may be a 4G network.

Specifically, the 3GPP network 120 includes an access network 121 and a core network 122, while the 3GPP network 130 includes an access network 131 and a core network 132. The access networks 121 and 131 are responsible for processing radio signals, terminating radio protocols, and connecting the mobile communication device 110 with the core networks 122 and 132, respectively, while the core networks 122 and 132 are responsible for performing mobility management, network-side authentication, and interfaces with public/external networks (e.g., the data network 160).

In one embodiment, if the 3GPP network 120 or 130 is a 5G network, the access network 121 or 131 may be a Next Generation Radio Access Network (NG-RAN) and the core network 122 or 132 may be a Next Generation Core Network (NG-CN). The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

In one embodiment, if the 3GPP network 130 is a 4G network, the access network 131 may be an Evolved-Universal Terrestrial Radio Access Network (E-UTRAN) and the core network 132 may be an Evolved Packet Core (EPC). The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

In another embodiment, the non-3GPP interworking gateway 140 and the IMS server 150 may be incorporated into the 3GPP network 130.

The non-3GPP interworking gateway 140 may enable secure communications between the mobile communication device 110 and the core network 132 over either a non-3GPP radio access (e.g., Wireless-Fidelity (Wi-Fi) access) and/or a 3GPP radio access (e.g., radio bearers of the 3GPP network 120), and allow the mobile communication device 110 to register with the IMS server 150.

In one embodiment, the non-3GPP interworking gateway 140 may be an evolved Packet Data Gateway (ePDG) if the 3GPP network 130 is a 4G network.

In another embodiment, the non-3GPP interworking gateway 140 may be an N3IWF if the 3GPP network 130 is a 5G network.

To be more specific, the 3GPP network 120 does not support voice call service, such as VoNR in 5G system, while the mobile communication device 110 and the 3GPP network 130 both support Voice over Wireless-Fidelity (VoWiFi). Therefore, when the mobile communication device 110 is camped on the 3GPP network 120, the mobile communication device 110 may use the radio bearers of the 3GPP network 120 to establish a secure tunnel with the non-3GPP interworking gateway 140 and to use the secure tunnel to register with the IMS server 150. Advantageously, the mobile communication device 110 may be able to obtain voice call service when camped on the 3GPP network 120 which does not support voice call service (e.g., VoNR in 5G system).

Please note that, in conventional practices, an ePDG or N3IWF is dedicated to enable secure communications between a UE and a 4G/5G core network over non-3GPP radio access (e.g., Wi-Fi radio access) only, which is also referred to as VoWiFi. That is, conventional UEs can only use Wi-Fi radio access to register the IMS service via the ePDG/N3IWF. However, the VoWiFi feature will not work in situations where no Wi-Fi radio access is available in the UE's location.

It should be understood that the wireless communication environment 100 depicted in FIG. 1 is for illustrative purposes only and it is not intended to limit the scope of the application. For example, the 3GPP network 120 may be a 6G network and the 3GPP network 130 may be a 5G network, as long as the 6G network does not support voice call service and the 5G network supports VoWiFi.

Figure 2:
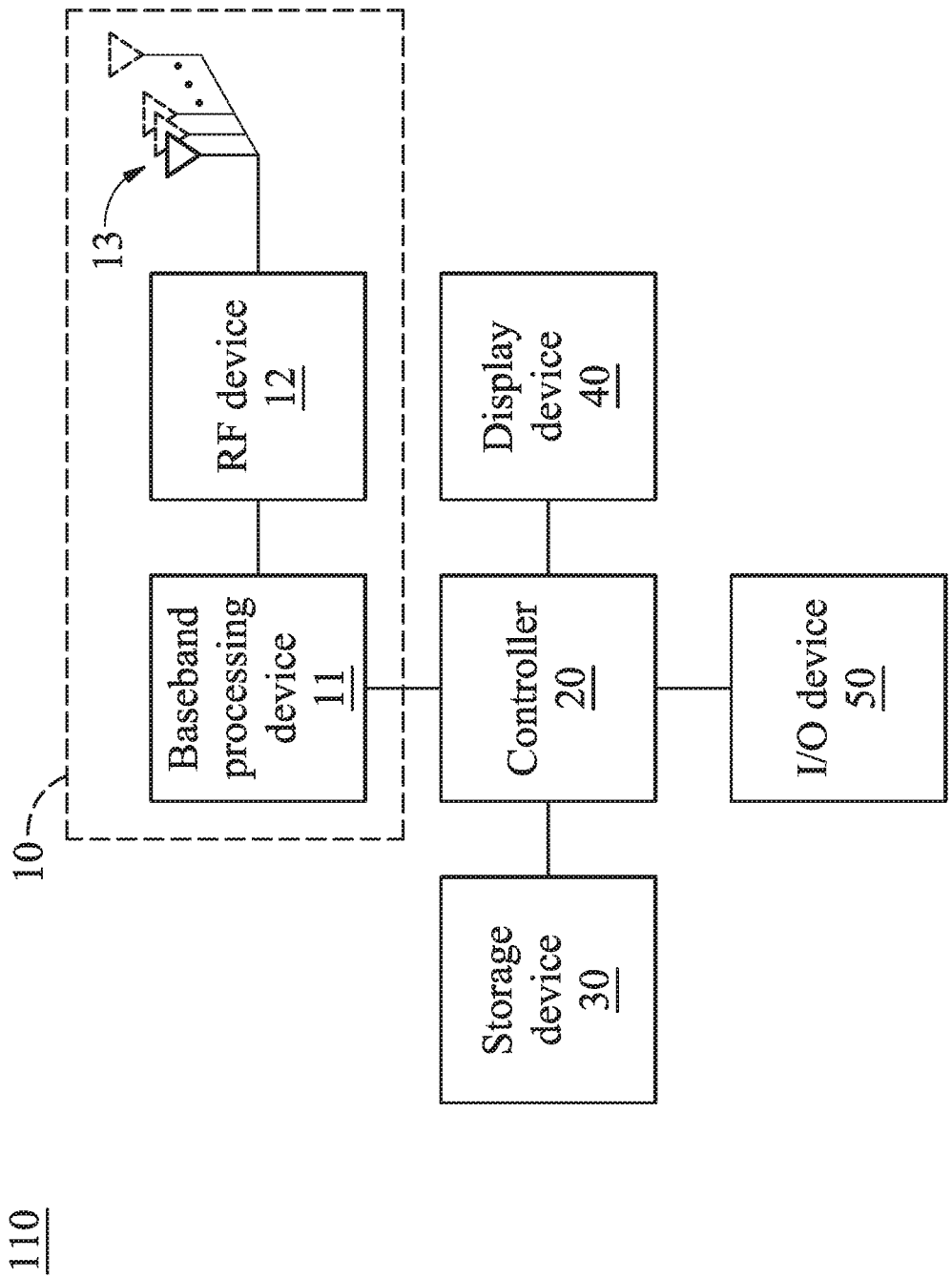
FIG. 2 is a block diagram illustrating the mobile communication device 110 according to an embodiment of the application.

FIG. 2 is a block diagram illustrating the mobile communication device 110 according to an embodiment of the application.

The mobile communication device 110 may include a wireless transceiver 10, a controller 20, a storage device 30, a display device 40, and an Input/Output (I/O) device 50.

The wireless transceiver 10 is configured to perform wireless transmission and reception to and from the 3GPP network 120. Specifically, the wireless transceiver 10 may include a baseband processing device 11, a Radio Frequency (RF) device 12, and antenna(s) 13, wherein the antenna(s) 13 may include one or more antennas for beamforming. The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 12 may receive RF wireless signals via the antenna(s) 13, convert the received RF wireless signals to baseband signals, which are processed by the baseband processing device 11, or receive baseband signals from the baseband processing device 11 and convert the received baseband signals to RF wireless signals, which are later transmitted via the antenna(s) 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 2.4 GHz or 5 GHz utilized in Wi-Fi systems, or may be 900 MHz, 2100 MHz, or 2.6 GHz utilized in 4G (e.g., LTE/LTE-A/TD-LTE) systems, or may be any radio frequency (e.g., 30 GHz-300 GHz for mmWave, or 3.3 GHz-4.9 GHz for sub-6) utilized in 5G (e.g., NR) systems, or another radio frequency, depending on the RAT in use.

In another embodiment, the wireless transceiver 10 may include multiple sets of a baseband processing device, an RF device, and an antenna, wherein each set of a baseband processing device, an RF device, and an antenna is configured to perform wireless transmission and reception using a respective RAT. For example, one set of a baseband processing device, an RF device, and an antenna is configured to perform wireless transmission and reception using the Wi-Fi technology, while another set of a baseband processing device, an RF device, and an antenna is configured to perform wireless transmission and reception using the 5G technology.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless transceiving with the 3GPP network 120, enabling the storage device 30 for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method for voice call service provision.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium which may include any combination of the following: a Subscriber Identity Module (SIM) or Universal SIM (USIM), a non-volatile memory (e.g., a FLASH memory or a Non-Volatile Random Access Memory (NVRAM)), a magnetic storage device (e.g., a hard disk or a magnetic tape), and an optical disc. A SIM/USIM may contain SIM/USIM application containing functions, file structures, and elementary files, and it may be technically realized in the form of a physical card or in the form of a programmable SIM (e.g., eSIM) that is embedded directly into the mobile communication device 110. The storage device 30 may be used for storing data, including UE and/or network capability information (e.g., information regarding whether the mobile communication device 110 supports VoWiFi, and a list of 3GPP networks supporting VoWiFi, which may be updated via Over-The-Air (OTA)), and computer-readable instructions and/or program code of applications, communication protocols, and/or the method for voice call service provision (or the methods of the present application may be realized as a part of the communication protocols).

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the mobile communication device 110 may include more components, such as a power supply, or a Global Positioning System (GPS) device, wherein the power supply may be a mobile/replaceable battery providing power to all the other components of the mobile communication device 110, and the GPS device may provide the location information of the mobile communication device 110 for use of some location-based services or applications. Alternatively, the mobile communication device 110 may include fewer components. For example, the mobile communication device 110 may not include the display device 40 and/or the I/O device 50.

Figure 3A:
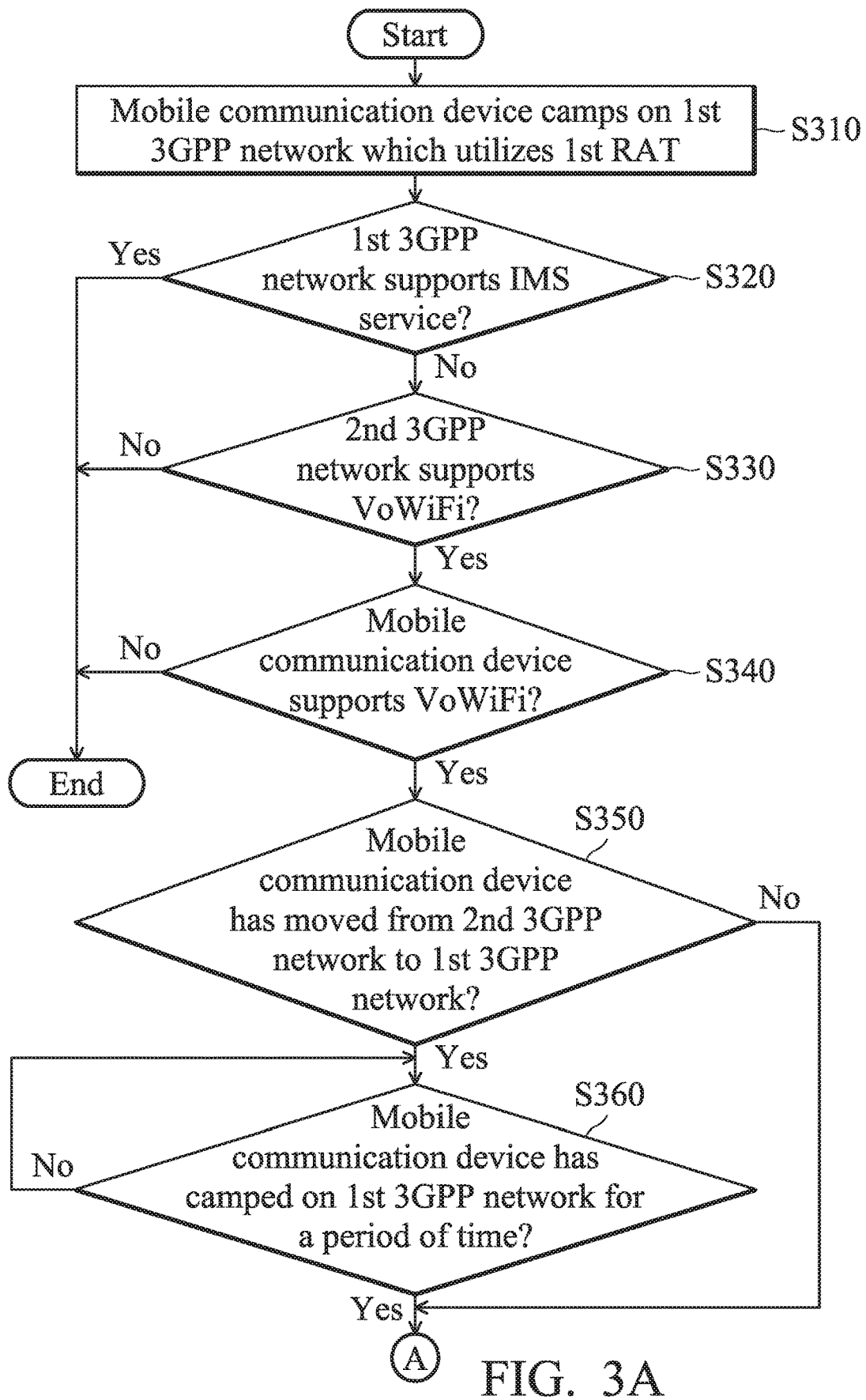
FIGS. 3A and 3B show a flow chart illustrating the method for voice call service provision according to an embodiment of the application.
Figure 3B:
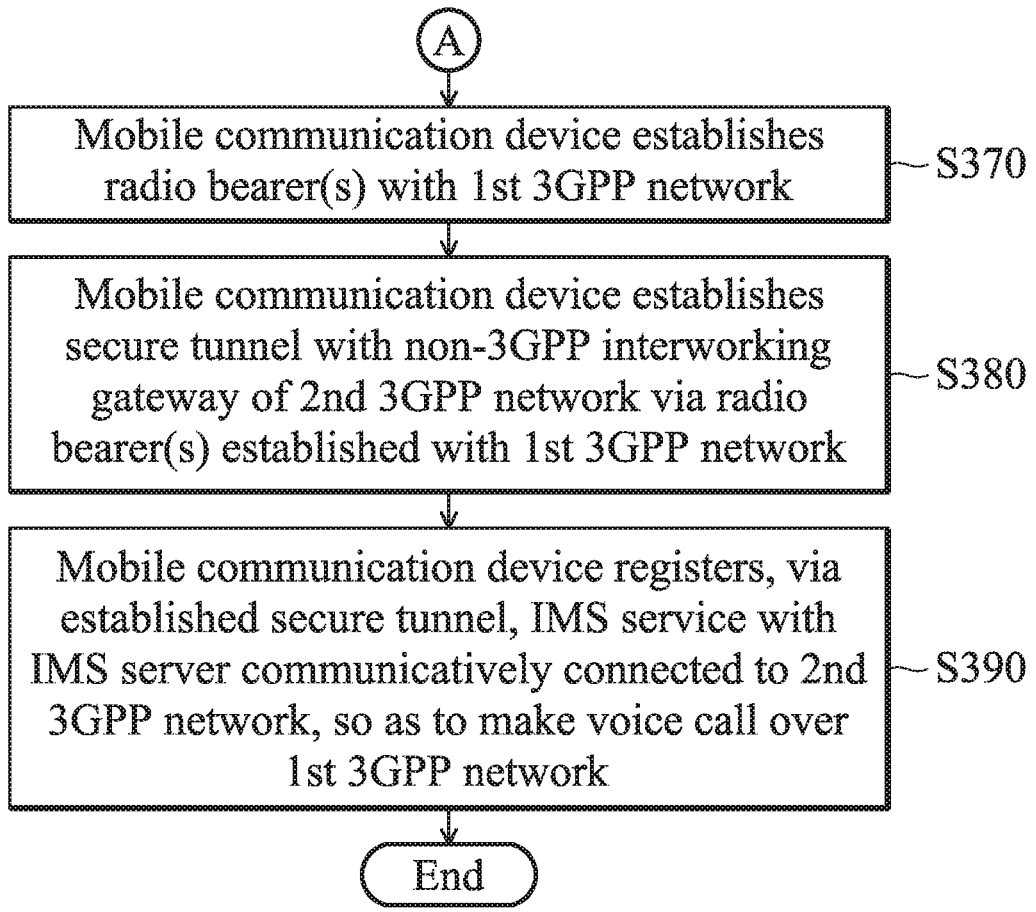

FIGS. 3A and 3B show a flow chart illustrating the method for voice call service provision according to an embodiment of the application.

In this embodiment, the method is applied to a mobile communication device (e.g., the mobile communication device 110) communicatively connected to a first 3GPP network (e.g., the 3GPP network 120) using a first RAT (e.g., the 5G technology).

To begin with, the mobile communication device camps on the first 3GPP network (step S310). Specifically, by camping on the first 3GPP network, it may mean that the mobile communication device has connected to and registered with the first 3GPP network.

Next, the mobile communication device determines whether the first 3GPP network supports the IMS service (step S320). Specifically, the mobile communication device may determine whether the first 3GPP network supports the IMS service based on the system information received from the first 3GPP network. For example, if the first 3GPP network is a 5G network, the mobile communication device may determine that the 5G network supports IMS service when the system information indicates that the 5G network support VoNR.

Subsequent to step S320, if the first 3GPP network supports the IMS service, the method ends. Otherwise, if the first 3GPP network does not support the IMS service, the mobile communication device determines whether the second 3GPP network supports VoWiFi (step S330). Specifically, the mobile communication device may determine whether the second 3GPP network supports VoWiFi based on the SIM/USIM data stored in the mobile communication device.

Subsequent to step S330, if the second 3GPP network does not support VoWiFi, the method ends. Otherwise, if the second 3GPP network supports VoWiFi, the mobile communication device determines whether the mobile communication device supports VoWiFi (step S340). Specifically, the mobile communication device may determine whether it supports VoWiFi based on the UE capability information stored therein.

Subsequent to step S340, if the mobile communication device does not support VoWiFi, the method ends. Otherwise, if the mobile communication device supports VoWiFi, the mobile communication device determines whether the mobile communication device has moved from a second 3GPP network (e.g., the 3GPP network 130) to the first 3GPP network (step S350). Specifically, the second 3GPP network utilizes a second RAT (e.g., the 4G technology) that is legacy to the first RAT.

Subsequent to step S350, if the mobile communication device has moved from the second 3GPP network to the first 3GPP network, the mobile communication device determines whether the mobile communication device has camped on the first 3GPP network for a period of time (e.g., from zero to several seconds) (step S360).

Subsequent to step S360, if the mobile communication device has camped on the first 3GPP network for the period of time, the mobile communication device establishes one or more radio bearers with the first 3GPP network (step S370).

Back to step S360, if the mobile communication device has not camped on the first 3GPP network for a period of time, step S360 is repeated.

Subsequent to step S370, the mobile communication device establishes a secure tunnel with a non-3GPP interworking gateway (e.g., ePDG/N3IWF) of the second 3GPP network via the radio bearers established with the first 3GPP network (step S380).

Subsequent to step S380, the mobile communication device registers, via the secure tunnel, the IMS service with an IMS server communicatively connected to the second 3GPP network, so as to make a voice call over the first 3GPP network (step S390).

Specifically, the period of time is configured to delay steps S370~390, thereby avoiding the ping-pong effect which refers to the case where the mobile communication device may wonder back and forth at/near the boundaries of radio signal coverage of the first and second 3GPP networks.

Back to step S350, if the mobile communication device has not moved from the second 3GPP network to the first 3GPP network, the method proceeds to step S370.

In one embodiment, step S370 may be skipped if the radio bearers have been established when the mobile communication device camps on the first 3SPP network in step S310.

Figure 4:
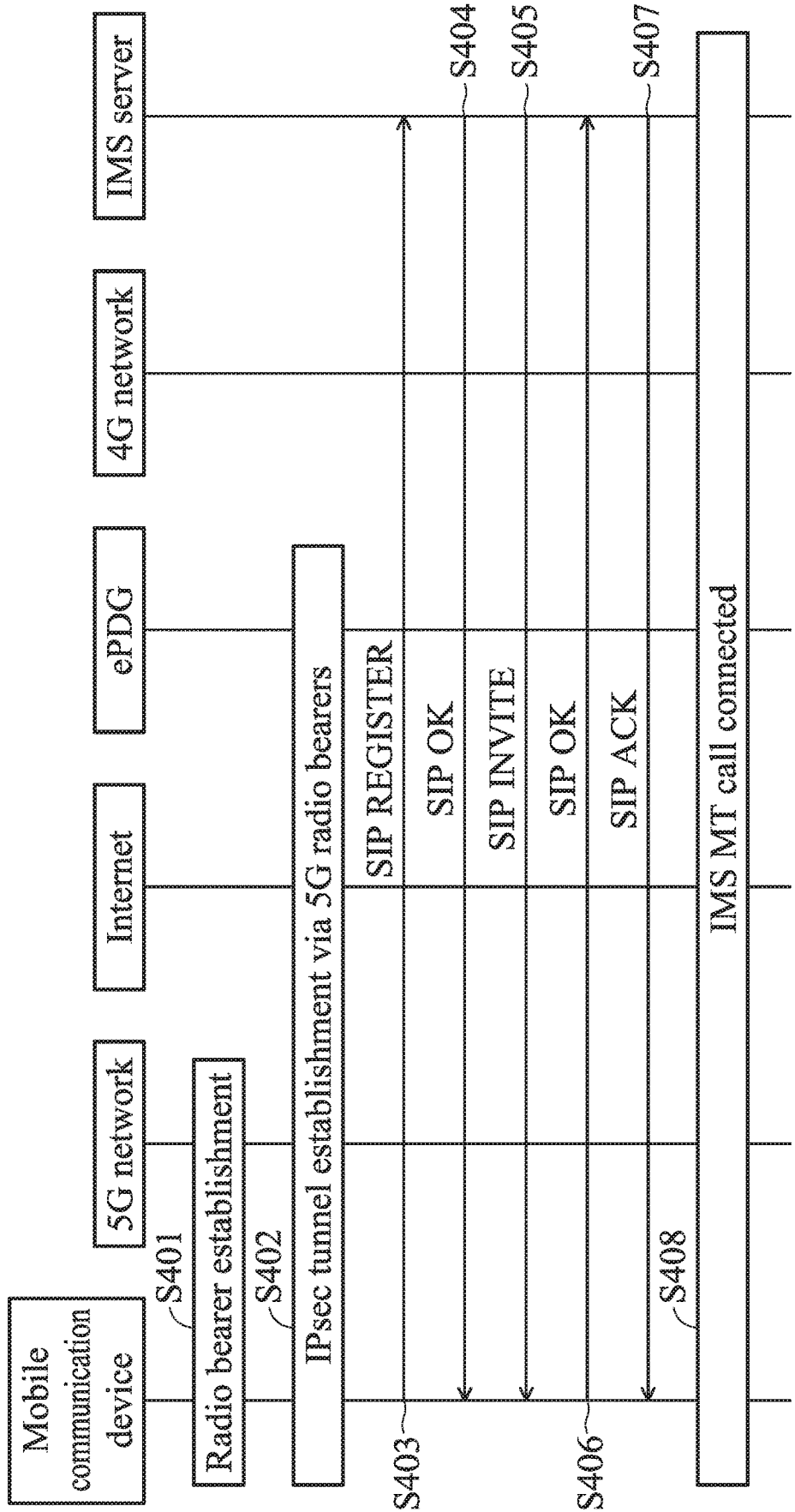
FIG. 4 is a message sequence chart illustrating receipt of an IMS MT call in a UE camped on a 5G network not supporting VoNR according to an embodiment of the application.

FIG. 4 is a message sequence chart illustrating receipt of an IMS MT call in a mobile communication device camped on a 5G network not supporting VoNR according to an embodiment of the application.

In this embodiment, it is assumed that the 5G network on which the mobile communication device is camped does not support VoNR, and both the mobile communication device (e.g., the mobile communication device 110) and the 4G network (e.g., the 3GPP network 130) support VoWiFi.

To begin with, the mobile communication device establishes one or more radio bearers with the 5G network (step S401).

Next, the mobile communication device establishes an Internet Protocol Security (IPsec) tunnel with the ePDG (e.g., the non-3GPP interworking gateway 140) via the 5G radio bearers (step S402), wherein the IPsec tunnel provides secure IP communications between the mobile communication device and the 4G network (e.g., the 3GPP network 130) with authentication and encryption of each IP packet communicated therebetween.

After that, the mobile communication device registers with the IMS server (e.g., the IMS server 150) of the 4G network through the IPsec tunnel, by sending a Session Initiation Protocol (SIP) REGISTER message (step S403).

In response to receiving the SIP REGISTER message, the IMS server replies to the mobile communication device with a SIP OK message through the IPsec tunnel (step S404). The registration with the IMS server is completed successfully when the mobile communication device receives the SIP OK message.

Subsequently, the IMS server sends a SIP INVITE message to the mobile communication device through the IPsec tunnel in response to detecting that there's an incoming IMS call for the mobile communication device (step S405).

When receiving the SIP INVITE message, the mobile communication device replies to the IMS server with a SIP OK message through the IPsec tunnel for accepting the IMS MT call (step S406), and then receives a SIP ACK message from the IMS server through the IPsec tunnel (step S407).

Upon receiving the SIP ACK message, the IMS MT call for the mobile communication device camped on the 5G network is connected (step S408).

Figure 5:
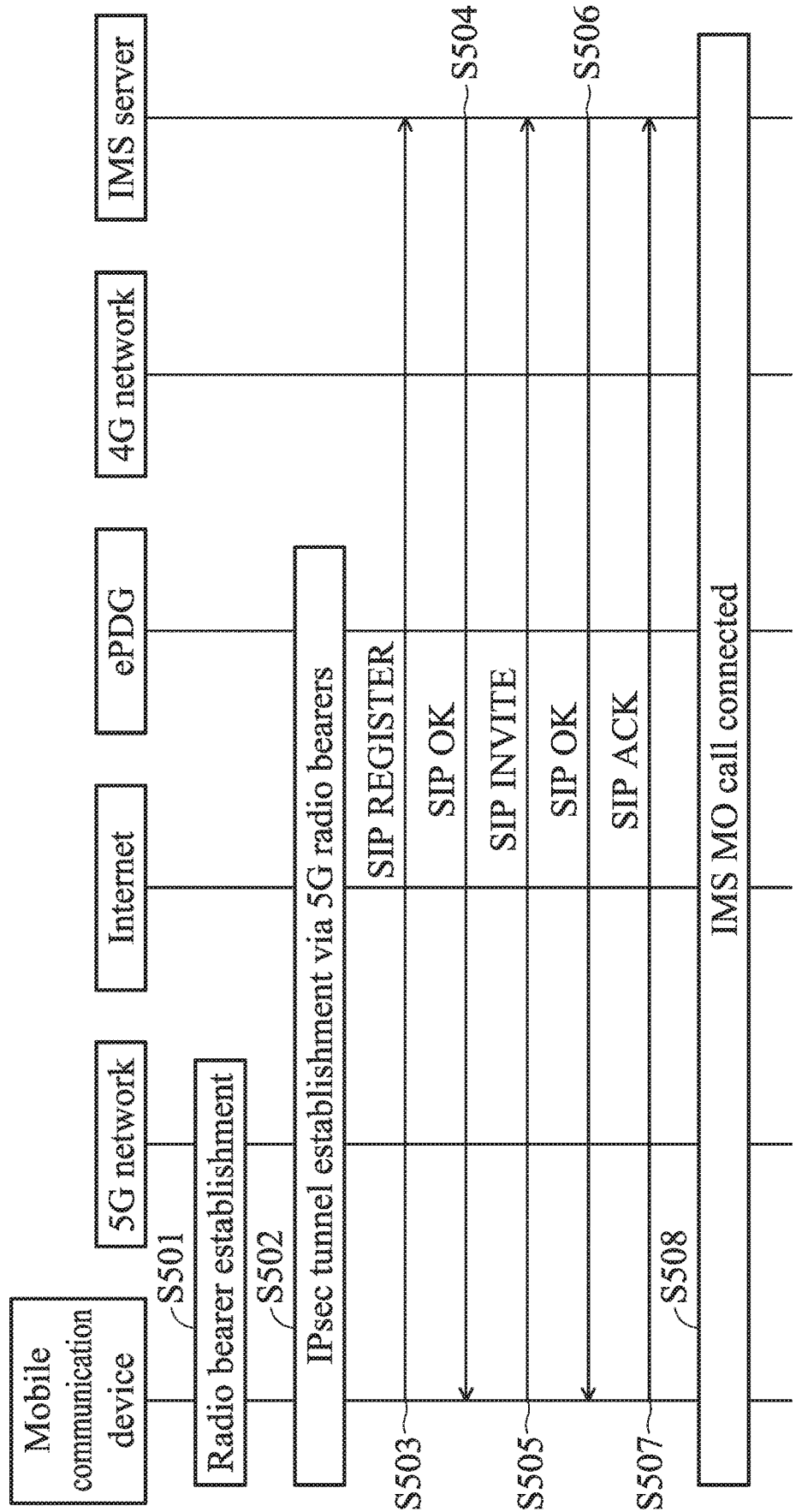
FIG. 5 is a message sequence chart illustrating making an IMS MO call in a UE camped on a 5G network not supporting VoNR according to an embodiment of the application.

FIG. 5 is a message sequence chart illustrating making an IMS MO call in a mobile communication device camped on a 5G network not supporting VoNR according to an embodiment of the application.

In this embodiment, it is assumed that the 5G network on which the mobile communication device is camped does not support VoNR, and both the mobile communication device (e.g., the mobile communication device 110) and the 4G network (e.g., the 3GPP network 130) support VoWiFi.

Similar to steps S401 to S404, the mobile communication device establishes one or more radio bearers with the 5G network, establishes an IPsec tunnel with the ePDG (e.g., the non-3GPP interworking gateway 140) via the 5G radio bearers, and registers with the IMS server (e.g., the IMS server 150) of the 4G network (e.g., the 3GPP network 130) through the IPsec tunnel (step S501~S504).

After that, in response to initiating an IMS MO call, the mobile communication device sends a SIP INVITE message to the IMS server of the 4G network through the IPsec tunnel (step S505).

When receiving the SIP INVITE message, the IMS server replies to the mobile communication device with a SIP OK message through the IPsec tunnel for accepting the IMS MO call (step S506), and then the mobile communication device sends a SIP ACK message to the IMS server through the IPsec tunnel (step S507).

Upon receiving the SIP ACK message, the IMS MO call for the mobile communication device camped on the 5G network is connected (step S508).

In view of the forgoing embodiments, it will be appreciated that the present application realizes voice call service provision for a mobile communication device camped on a 5G network not supporting VoNR, by allowing the mobile communication device to use 5G radio bearers to connect to the ePDG of a 4G network and register the IMS service via the ePDG of the 4G network. Advantageously, the mobile communication device may stay in the 5G network and obtain the voice call service over the 5G network without having to fall back to the 4G network.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
    a wireless transceiver, configured to perform wireless transmission and reception to and from a first 3rd Generation Partnership Project (3GPP) network using a first Radio Access Technology (RAT); and
    a controller, configured to:
    establish one or more radio bearers with the first 3GPP network via the wireless transceiver;
    establish a secure tunnel with a non-3GPP interworking gateway of a second 3GPP network via the radio bearers, wherein the second 3GPP network utilizes a second RAT;
    register, via the secure tunnel, an IP Multimedia Subsystem (IMS) service with an IMS server communicatively connected to the second 3GPP network, so as to make a voice call over the first 3GPP network;
    determine whether the mobile communication device has moved from the second 3GPP network to the first 3GPP network; and
    delay the establishing of the secure tunnel with the non-3GPP interworking gateway and the registering with the IMS server for a period of time in response to the mobile communication device having moved from the second 3GPP network to the first 3GPP network.

2. The mobile communication device as claimed in claim 1, wherein the controller is further configured to:
    determine whether the first 3GPP network supports the IMS service based on system information received from the first 3GPP network; and
    wherein the establishing of the secure tunnel with the non-3GPP interworking gateway and the registering with the IMS server are performed in response to the first 3GPP network not supporting the IMS service.

3. The mobile communication device as claimed in claim 1, wherein the controller is further configured to:
    determine whether the second 3GPP network supports Voice over Wireless-Fidelity (VoWiFi) based on information stored in the mobile communication device; and
    wherein the establishing of the secure tunnel with the non-3GPP interworking gateway and the registering with the IMS server are performed in response to the second 3GPP network supporting VoWiFi.

4. The mobile communication device as claimed in claim 1, wherein the controller is further configured to:
    determine whether the mobile communication device supports Voice over Wireless-Fidelity (VoWiFi) based on information stored in the mobile communication device; and
    wherein the establishing of the secure tunnel with the non-3GPP interworking gateway and the registering with the IMS server are performed in response to the mobile communication device supporting VoWiFi.

5. The mobile communication device as claimed in claim 1, wherein the non-3GPP interworking gateway is an evolved Packet Data Gateway (ePDG) in response to the first RAT being a fifth generation (5G) RAT specified by 3GPP and the second RAT being a fourth generation (4G) RAT specified by 3GPP.

6. The mobile communication device as claimed in claim 1, wherein the non-3GPP interworking gateway is a Non-3GPP Inter-Working Function (N3IWF) in response to the second RAT being a fifth generation (5G) RAT specified by 3GPP and the first RAT being more advanced than the second RAT.

7. A method for voice call service provision, executed by a mobile communication device communicatively connected to a first 3rd Generation Partnership Project (3GPP) network using a first Radio Access Technology (RAT), the method comprising:
    establishing one or more radio bearers with the first 3GPP network;
    establishing a secure tunnel with a non-3GPP interworking gateway of a second 3GPP network via the radio bearers, wherein the second 3GPP network utilizes a second RAT;
    registering, via the secure tunnel, an IP Multimedia Subsystem (IMS) service with an IMS server communicatively connected to the second 3GPP network, so as to make a voice call over the first 3GPP network;
    determining whether the mobile communication device has moved from the second 3GPP network to the first 3GPP network; and
    delaying the establishing of the secure tunnel with the non-3GPP interworking gateway and the registering with the IMS server for a period of time in response to the mobile communication device having moved from the second 3GPP network to the first 3GPP network.

8. The method as claimed in claim 7, further comprising:
determining whether the first 3GPP network supports the IMS service based on system information received from the first 3GPP network;
wherein the establishing of the secure tunnel with the non-3GPP interworking gateway and the registering with the IMS server are performed in response to the first 3GPP network not supporting the IMS service.

9. The method as claimed in claim 7, further comprising:
determining whether the second 3GPP network supports Voice over Wireless-Fidelity (VoWiFi) based on information stored in the mobile communication device;
wherein the establishing of the secure tunnel with the non-3GPP interworking gateway and the registering with the IMS server are performed in response to the second 3GPP network supporting VoWiFi.

10. The method as claimed in claim 7, further comprising:
determining whether the mobile communication device supports Voice over Wireless-Fidelity (VoWiFi) based on information stored in the mobile communication device;
wherein the establishing of the secure tunnel with the non-3GPP interworking gateway and the registering with the IMS server are performed in response to the mobile communication device supporting VoWiFi.

11. The method as claimed in claim 7, wherein the non-3GPP interworking gateway is an evolved Packet Data Gateway (ePDG) in response to the first RAT being a fifth generation (5G) RAT specified by 3GPP and the second RAT being a fourth generation (4G) RAT specified by 3GPP.

12. The method as claimed in claim 7, wherein the non-3GPP interworking gateway is a Non-3GPP Inter-Working Function (N3IWF) in response to the second RAT being a fifth generation (5G) RAT specified by 3GPP and the first RAT being more advanced than the second RAT.

13. A non-transitory computer-readable storage medium having computer-readable instructions stored thereon that, when executed by a mobile communication device, cause the mobile communication device to:
establish one or more radio bearers with a first 3rd Generation Partnership Project (3GPP) network utilizing a first Radio Access Technology (RAT);
establish a secure tunnel with a non-3GPP interworking gateway of a second 3GPP network via the radio bearers, wherein the second 3GPP network utilizes a second RAT;
register, via the secure tunnel, an IP Multimedia Subsystem (IMS) service with an IMS server communicatively connected to the second 3GPP network, so as to make a voice call over the first 3GPP network;
determine whether the mobile communication device has moved from the second 3GPP network to the first 3GPP network; and
delay the establishing of the secure tunnel with the non-3GPP interworking gateway and the registering with the IMS server for a period of time in response to the mobile communication device having moved from the second 3GPP network to the first 3GPP network.

14. The non-transitory computer-readable storage medium as claimed in claim 13, wherein the computer-readable instructions further cause the mobile communication device to:
determine whether the first 3GPP network supports the IMS service based on system information received from the first 3GPP network;
wherein the establishing of the secure tunnel with the non-3GPP interworking gateway and the registering with the IMS server are performed in response to the first 3GPP network not supporting the IMS service.

15. The non-transitory computer-readable storage medium as claimed in claim 13, wherein the computer-readable instructions further cause the mobile communication device to:
determine whether the second 3GPP network supports Voice over Wireless-Fidelity (VoWiFi) based on information stored in the mobile communication device;
wherein the establishing of the secure tunnel with the non-3GPP interworking gateway and the registering with the IMS server are performed in response to the second 3GPP network supporting VoWiFi.

16. The non-transitory computer-readable storage medium as claimed in claim 13, wherein the computer-readable instructions further cause the mobile communication device to:
determine whether the mobile communication device supports Voice over Wireless-Fidelity (VoWiFi) based on information stored in the mobile communication device;
wherein the establishing of the secure tunnel with the non-3GPP interworking gateway and the registering with the IMS server are performed in response to the mobile communication device supporting VoWiFi.

17. The non-transitory computer-readable storage medium as claimed in claim 13, wherein the non-3GPP interworking gateway is an evolved Packet Data Gateway (ePDG) in response to the first RAT being a fifth generation (5G) RAT specified by 3GPP and the second RAT being a fourth generation (4G) RAT specified by 3GPP; or wherein the non-3GPP interworking gateway is a Non-3GPP Inter-Working Function (N3IWF) in response to the second RAT being a fifth generation (5G) RAT specified by 3GPP and the first RAT being more advanced than the second RAT.

* * * * *